United States Patent
Nakagaki et al.

[19]

[11] Patent Number: 5,963,517
[45] Date of Patent: Oct. 5, 1999

[54] DISK REPRODUCING SPEED CONTROL METHOD AND A DISK REPRODUCING APPARATUS USING THE SAME

[75] Inventors: Harushige Nakagaki; Tokinori Furuichi, both of Yokohama; Kazuhiro Oda; Ryuichi Koike, both of Chigasaki; Hideo Suenaga, Yokohama, all of Japan

[73] Assignee: Hitachi, Ltd., Tokyo, Japan

[21] Appl. No.: 08/785,537

[22] Filed: Jan. 17, 1997

[30] Foreign Application Priority Data

Jan. 19, 1996 [JP] Japan ................................. 8-007129

[51] Int. Cl.[6] ........................... G11B 5/09; G11B 17/22
[52] U.S. Cl. ............................................ 369/47; 369/32
[58] Field of Search ............................ 369/47, 48, 50, 369/32, 13, 124, 111, 54, 58, 59; 360/114, 73.03, 77.05, 78.14

[56] References Cited

U.S. PATENT DOCUMENTS 4,984,227  1/1991  Yoshimaru ............................ 369/32
5,691,968  11/1997 Tomishima et al. .................. 369/50

*Primary Examiner*—Ali Neyzari
*Attorney, Agent, or Firm*—Antonelli, Terry, Stout & Kraus, LLP

[57] ABSTRACT

An method to prevent excessive heat generation of the pickup actuator from occurring when a disk has a large eccentricity or planar vibration in a high-speed disk reproducing apparatus using an optical pickup. The disk reproducing apparatus has a status determining arrangement for monitoring a present actuator drive state, an analyzing arrangement for analyzing an output signal of the status determining arrangement, and disk rotational speed switching control arrangement for selecting disk reproducing speeds according to a control signal of the identification means, thereby lowering the reproducing speed when the eccentricity or planar vibration is large. Such invention prevents heat generation of the pickup actuator from occurring because high-speed reproduction can be performed when the eccentricity or planar vibration is small, and reproduction speed can be automatically reduced when the eccentricity or planar vibration is large.

32 Claims, 8 Drawing Sheets

DISK REPRODUCING SPEED CONTROL METHOD AND A DISK REPRODUCING APPARATUS USING THE SAME

BACKGROUND OF THE INVENTION

1. Field of the Invention

The present invention relates to a disk reproducing method used with an optical pickup and providing high-speed reproduction, and a disk reproducing apparatus based on this method. More particularly, the present invention relates to a disk reproducing method and apparatus suitable for preventing excessive actuator heat generation of a pickup, such heat generation being caused by track following/focusing during disk eccentricity or planar vibration.

2. Description of Related Art

The CD (Compact Disk) player has long been in practical use. Recently, a so-called CD-ROM apparatus using a CD storage medium has been applied as a personal computer peripheral device, and such CD-ROM arrangement has been rapidly gaining popularity. Over time, a speed of the CD-ROM apparatus has increased because of an ongoing requirement for higher data transfer rates. Today's mainstream trend is toward a 4× speed (i.e., four times the speed of an original standard speed) CD-ROM as standard equipment, and in the near future, 8× speed and even higher speed machines are expected.

FIG. 5 is a basic block diagram illustrating a servo system for tracking control and focusing control of a disadvantaged pickup arrangement. An actuator 40 receives an electrical signal $V_2$ to output a mechanical displacement x. The magnitude and orientation of x are detected by a detector 41 to provide an electrical signal $V_1$. $V_1$ is compared with a reference electrical signal 42 ($V_{ref}$) in a comparator 43 to provide a differential voltage $V_e$, which is appropriately amplified by an amplifier 44 to be fed back to an actuator 40.

FIG. 6 is a schematic diagram illustrating the principle of an optical pickup for reproducing a disk. Reference numeral 1 indicates an optical disk which rotates around an axis 50. A laser diode 51 operates as a light source. The light beam from the light source travels a path along a collimator lens system 52, a beam splitter 53, a mirror 54, and a tube 55 including an objective lens system (not shown), to thus focus on a recording surface of the disk 1. The reflected light beam from the disk 1 travels a return path along the tube 55, mirror 54 and mirror 53, to form a light spot on a light detector 41. The tube 55 is supported by a spring 56 and attached with a coil 57. Because the magnetic field of a magnet 58 reacts with any magnetic field generated by the coil 57, flowing a current through the coil 57 moves (i.e., positions) the tube 55. More particularly, as a result of the spring-56/coil-57/magnet-58 arrangement and other positioning actuator arrangements (not shown, but known in the art), a moving (i.e., positioning) force can be generated in both a tracking direction (left and right) and a focusing direction (up and down), e.g., to position the tube 55 (and objective lens; not shown) to follow a disk eccentricity 100 and/or a planar vibration 102, respectively. The CD-ROM actuator for controlling these two directions is provided with two coils. FIG. 6 shows only one coil for simplicity and clarity of illustration and description. Namely, FIG. 6 shows a model of a linear actuator.

FIG. 7 is a diagram describing an output waveform of the detector 41 in relation to a surface of the disc 1. As background, information can be recorded on the surface of the disk 1 in many ways. In FIG. 7, information is recorded by providing recesses called pits on the recording surface. The output of the detector 41 increases or decreases according to a shift of the light spot to the left or the right from the center or zero point of a track 59. This increase or decrease occurs every time the light spot traverses an adjacent track, so that a detector output such as 60 is generated.

A tracking servo is provided to hold the light spot at the center of a selected track 59. If tracking gets out of control, for example, due to an eccentricity 100 (FIG. 6) of the disk 1 or rotating system, due to a track meandering or due to a shock applied to the apparatus, a positive or negative error signal occurs in the detector output 60. For correction, the tracking servo attempts to get the light spot back to the center of a selected track based on the error signal. Accuracy of this centering action is proportional to the open-loop gain of the servo system.

Although not shown, the actuator for the CD-ROM is a two dimensional arrangement, for example, the tube 55 is also driven in focusing direction. From the detector 41, a positive or negative error signal is outputted depending on an up or down deviation from a focus of the objective lens relative to the disk. According to this error signal, a focus servo attempts to focus the light spot back to an optimal focal point.

In performing linear positioning correction and/or focussing correction using actuators as discussed above, a high work load is imposed upon the actuators. Meanwhile, in increasing the CD-ROM speed to 8× or higher, heat generation of the pickup actuator caused by the system cyclically compensating for disk eccentricity 100 or planar vibration 102 presents a significant problem. More specifically, causing actuators to follow the extreme cyclical disk eccentricity 100 or planar vibration 102 of a disk rotating at an 8× or higher speed requires a high degree of cyclical positioning with the actuators; high physical movement results in high heat generation and/or power consumption.

More particularly, the above-mentioned problem will be described in greater specificity as follows. FIGS. 8A and 8B shows general examples of the gain and phase transition characteristics, respectively, of a tracking and focusing actuator for use in a CD-ROM apparatus. When a force is acted upon a mass (e.g., on the mass of the tube 55) supported by the spring, the gain and the phase present characteristics are indicated by 61 and 62 of FIGS. 8A and 8B, respectively. Namely, the transmission characteristic of the actuator is of a quadratic system. In FIG. 8A, $f_o$ is a lower-range resonance frequency determined by an actuator's variable mass, spring constant and frictional force. In a general actuator, $f_o$, is about 30 Hz.

Phase lag 62 (FIG. 8B) changes drastically over $f_o$ from zero to nearly $\pi$ radian. In FIG. 8A, $f_h$ is a higher-range resonance frequency caused mainly by a vibration of the tube 55, such vibration further increasing the phase lag 62. The frequency $f_A$ is an exemplary frequency within a range wherein a gain is linearly decreasing at −12 dB/octave.

On the other hand, FIG. 9 shows a relationship between disk reproduction high-speed ratio N and disk motor, namely disk rotational speed. In this example, a recording/reproducing method of a CD-ROM is a constant linear velocity (CLV) method in which a linear velocity between the pickup and disk is constant, and a rotational speed varies according to disk reproducing (i.e., head radial) position. More specifically, a CLV method has a 1.2 m/sec linear velocity standard, and signal recording on the disk is restricted to an area from 25 mm to 58 mm in a radial direction of the disk. Accordingly, at a 1× reproduction speed, for example, the rotational frequency (speed) at a position 25 mm from the inner disk periphery is about 8 Hz, and, in contrast, is about 3 Hz at a position on the outer 58 mm periphery of the disk as shown by curve 63 in FIG. 9. At a 4× reproduction speed, the rotational frequency is about 32 Hz at the inner periphery and about 12 Hz at the outer periphery, i.e., as shown by curve 64 in FIG. 9. Operation at such 1× and 4× speeds allow the device to operate within the initial flat gain area of FIG. 8A.

However, when an 8× reproduction speed is attempted, the disk rotational frequency increases to about 64 Hz ($f_A$ point) at the inner periphery as indicated by curve 65 in FIG. 9. Namely, the lower-range resonance frequency $f_o$ of the arrangement shown in FIG. 8A is exceeded, thus causing device operation disadvantageously within the secondary attenuation area. Such operation results in an increase in power dissipation and/or heat generation of the actuator. Namely, actuator sensitivity quadratically drops in device operation over $f_o$ because of the actuator characteristic, so that, if the eccentricity and planar vibration variables of the disk are fixed, the actuator drive voltage increases by the second power of ($f_A/f_o$) as compared with a 4× reproduction speed.

FIG. 10 is a graph illustrating the above-mentioned increase. More particularly, a power consumed by the actuator coil for tracking and focusing up to a 4× reproduction speed is constant, as indicated by line 66, i.e., is constant for speeds where the disk rotational frequency does not meet or exceed $f_0$. In stark contrast, during an 8× reproduction speed, the power dissipation increases conspicuously as indicated by curve 67. This increase in the power dissipation cannot be practically permitted in terms of two concerns, i.e., first, in terms of an allowable power since the actuator coil itself should be power conservative for economical use and/or long life, and second, in terms of a temperature rise subjected to the wrapped coil and the objective lens (for which a plastic lens is used) which is very closely located to the actuator coil. More particularly, an excessive and unacceptable temperature rise is caused by the actuator coil which may damage/destroy the actuator coil and/or objective lens.

One solution to the above-mentioned problem is to provide a stiffer spring which holds the actuator so as to increase $f_o$ over the maximum disk rotational speed of 64 Hz, by way of example. This, however, lowers a lower-area sensitivity (gain) of the actuator, providing no advantage.

SUMMARY OF THE INVENTION

It is therefore an object of the present invention to solve the problems mentioned above with respect to the disadvantaged arrangement.

More particularly, it is an object of the present invention to provide a disk reproducing method for preventing excessive actuator heat generation and/or power consumption due to disk planar vibration and eccentricity during reproduction, thus to ensure a highly reliable arrangement and optimize disk reproduction. Further, it is an object of the present invention to provide a disk reproducing apparatus based on such a method.

Disk eccentricity and planar vibration are not always large, i.e., such eccentricity and vibration varies from CD-ROM disk to CD-ROM disk, and even varies with different loadings of a same disk. Accordingly, the above-mentioned actuator heat generation problem occurs unpredictably and at different times, i.e., occurs when the actuator servo arrangement attempts to follow excessive disk eccentricity and planar vibration, and the power dissipation (and/or heat generation) of the actuator exceeds an allowable value at any given moment. More specifically, when eccentricity and planar vibration are small, a power dissipation of the actuator servo arrangement as it follows the small eccentricity and vibration does not exceed an allowable value, thus presenting no trouble in operation. In contrast, when eccentricity and planar vibration are large, a power dissipation (and/or heat generation) of the actuator servo arrangement as it follows the large eccentricity and vibration eventually exceeds an allowable value, thus presenting trouble in operation (e.g., servo coil burn-out, melting of plastic objective lens, etc.).

In carrying out the invention and according to one aspect thereof, there is provided a disk reproducing method wherein, if information associated with a drive state of an actuator section for performing focusing and/or tracking control on an information read section for reading information recorded on a disk is smaller than a predetermined value, the disk is reproduced by setting a disk reproducing speed to a first reproducing speed (e.g., 8× speed), and if information associated with an operating variable of the actuator section is greater than the predetermined value, the disk is reproduced by setting the reproducing speed to a second reproducing speed which is lower than the first reproducing speed (e.g., 7×). Such checking for excessive power consumption and/or heat can be constantly or periodically conducted, and if the information associated with the operating variable of the actuator section continues to be greater than the predetermined value after being set to the lower speed, the present invention can set the reproducing speed to third, fourth, etc., reproducing speeds (e.g., 7×→6× →5×→4×) which are successively lower until safe operation is obtained.

In carrying out the invention and according to another aspect thereof, there is provided a disk reproducing apparatus comprising: a switching control arrangement for switching a disk reproducing speed between a first reproducing speed and a second reproducing speed which is lower than the first reproducing speed depending on a drive state of the actuator section. This switching control arrangement may be constituted such that, if the information associated with an operating variable of the actuator section is smaller than a predetermined value, the disk reproducing speed is set to the first reproducing speed, and if the disk reproducing speed is greater than the predetermined value, the disk reproducing speed is set to the second reproducing speed. Further analogous arrangements similar to those discussed above with regard to the method embodiment can likewise be effected for the apparatus embodiment.

In carrying out the invention and according to still another aspect thereof, there may be provided a disk reproducing apparatus having an information read section for reading information recorded on a disk and an actuator section for performing focusing and/or tracking control on the information read section, comprising:

(a) a comparator arrangement having a comparator that outputs a signal when an operating variable of the actuator section has exceeded a reference value, the comparator arrangement outputting a signal obtained by smoothing the signal outputted from the comparator;

(b) a control signal arrangement for outputting a control signal when the signal outputted from the comparator has exceeded a predetermined value; and (c) a switching control arrangement for performing switching control, upon reception of the control signal outputted from the control signal arrangement, to at least switch a disk reproducing speed from a first reproducing speed to a second reproducing speed which is lower than the first reproducing speed.

The above-mentioned arrangements means may comprise a first filter for removing an information signal of the disk reproduced by the information read section from a drive voltage of the actuator coil, a comparator for outputting a signal when a signal outputted from the first filter has exceeded a reference value, and a second filter for smoothing (converting to direct current) the output of the comparator. At least a portion of the above-discussed operations and/or apparatus components can be effected using specific hardware implementations, or alternatively could be implemented via a microprocessor and software arrangement.

Further, a display (e.g., liquid crystal display (LCD), light emitting diode (LED), etc.) may be provided for displaying information indicating a current operating speed, or that the reproducing speed of the disk has been switched from the first reproducing speed to the second reproducing speed.

The above-mentioned novel construction permits an initial predetermined high-speed reproducing operation of 8×, for example, and allows such 8× speed to be continued as long as disk eccentricity and/or planar vibration are small. When disk eccentricity and planar vibration are large, the disk rotational speed switching control arrangement can automatically switch between reproducing speeds from 8× to 7× and further to 6×, etc., in sequence, for example, to change an operation of the apparatus to operate within an allowable power range of the actuator.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein.

DETAILED DESCRIPTION OF THE PREFERRED EMBODIMENTS OF THE INVENTION

Figure 1:
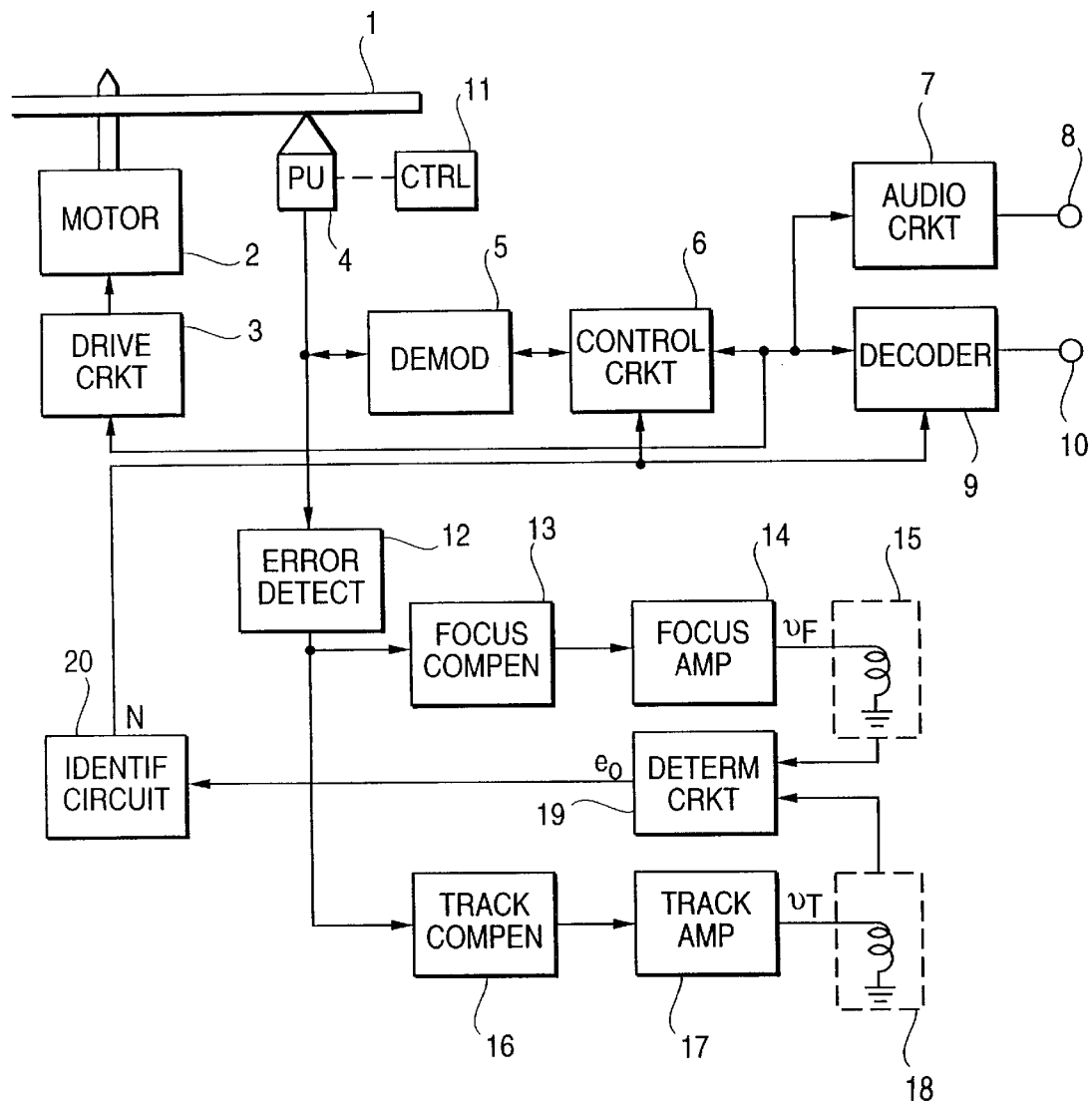
FIG. 1 is a block diagram illustrating a first embodiment of disk reproducing apparatus of the present invention.

Before beginning a detailed description of the subject invention, mention of the following is in order:

When appropriate, like reference numerals and characters are used to designate identical, corresponding or similar components in differing figure drawings. Further, reference numerals and characters which are offset by multiples of 100 (e.g., 210, 510, 910, etc.) are sometimes used to designate identical, corresponding or similar components in differing figure drawings.

This invention will hereinafter be described in further detail by way of example with reference to the accompanying drawings.

Referring to FIG. 1, there is shown a block diagram illustrating a first embodiment of a CD-ROM disk reproducing apparatus of the present invention. In the figure, reference numeral 1 indicates a disk, reference numeral 2 indicates a disk motor, reference numeral 3 indicates a disk motor drive circuit, reference numeral 4 indicates an optical pickup including a focusing actuator coil 15 and a tracking actuator coil 18, reference numeral 5 indicates a demodulator for demodulating a pickup output, reference numeral 6 indicates a disk rotational speed switching control means including a signal processing circuit, reference numeral 7 indicates an audio circuit, reference numeral 8 indicates an audio signal output terminal, reference numeral 9 indicates a CD-ROM decoder, reference numeral 10 indicates an output terminal thereof, reference numeral 11 indicates a feed control mechanism for moving pickup 4 in disk radial direction, reference numeral 12 indicates an error signal detecting circuit for focusing the servo and tracking servo, reference numeral 13 indicates a phase compensating circuit of a focus servo system, reference numeral 14 indicates a control amplifier, reference numeral 16 indicates a phase compensating circuit for a tracking servo system, reference numeral 17 indicates a control amplifier, reference numeral 19 indicates a status determining means, and reference numeral 20 indicates an identification means. In FIG. 1, the audio circuit and the like are shown although they are not directly associated with the purpose of the present invention.

The above-mentioned status determining means 19 monitors the drive states (e.g., voltages, currents, temperatures, vibration, etc.) of the focus actuator coil 15 and the tracking actuator coil 18 to detect disk eccentricity and planar vibration, and outputs a detect signal $e_0$ corresponding thereto. The identification means 20 identifies the level of the detect signal $e_0$ outputted from the status determining means 19 and recognizes that disk eccentricity or planar vibration is large if $e_0$ goes below a predetermined value. The identification means 20 thereafter outputs a control signal N (e.g., N=7) which lowers the reproduction speed from a high-speed reproducing speed/operation such as 8× to a lower-speed reproducing speed/operation such as 7×.

An example of one specific construction of the status determining means and operations thereof will now be described with reference to FIGS. 2 and 3.

Figure 2:
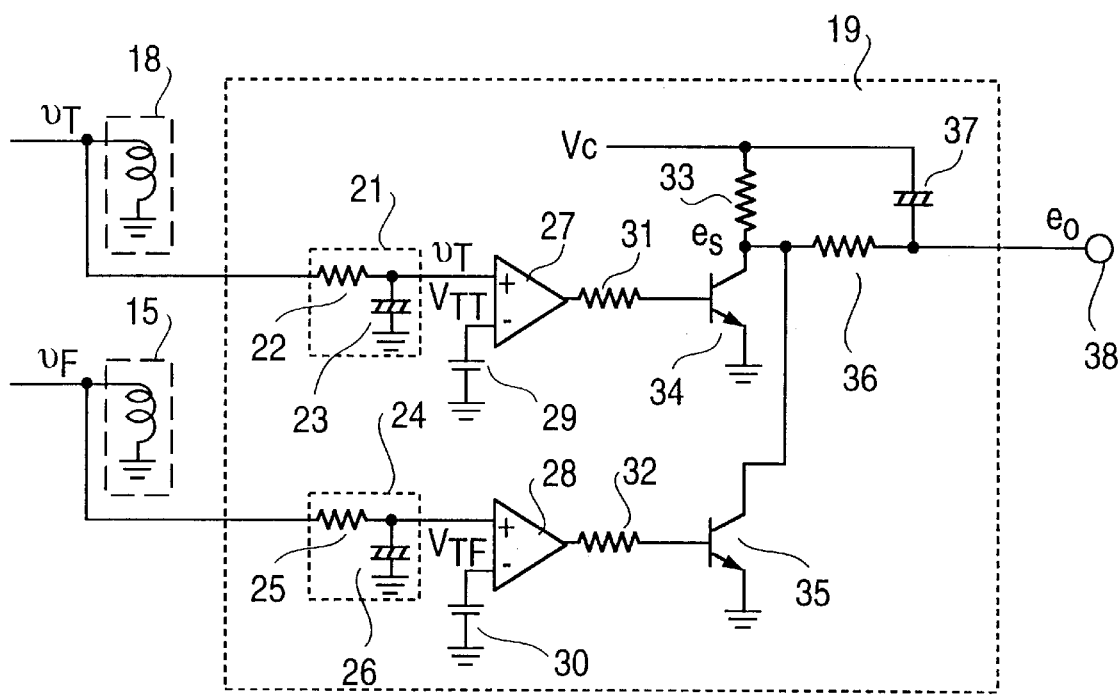
FIG. 2 is one specific example of a status determining circuit 19 useable in the first embodiment of FIG. 1.

More specifically, FIG. 2 shows an exemplary circuit construction for detecting disk eccentricity and planar vibration from a drive voltage level of the actuator coil 18. In the figure, reference numeral 21 indicates a lowpass filter composed of a resistor 22 and a capacitor 23, reference numeral 24 indicates another lowpass filter composed of a resistor 25 and a capacitor 26, reference numerals 27 and 28 indicate voltage comparators (e.g., operational amplifiers), reference numeral 29 and 30 indicate reference voltages, reference numerals 31 through 33 indicates resistors, reference numerals 34 and 35 indicates transistors, reference numerals 36 and 37 indicate a resistor and a capacitor, respectively, the combination of which constitutes a lowpass filter, and reference numeral 38 indicates an output terminal. Other components similar to those of FIG. 1 are denoted by the same reference numerals.

Figure 3:
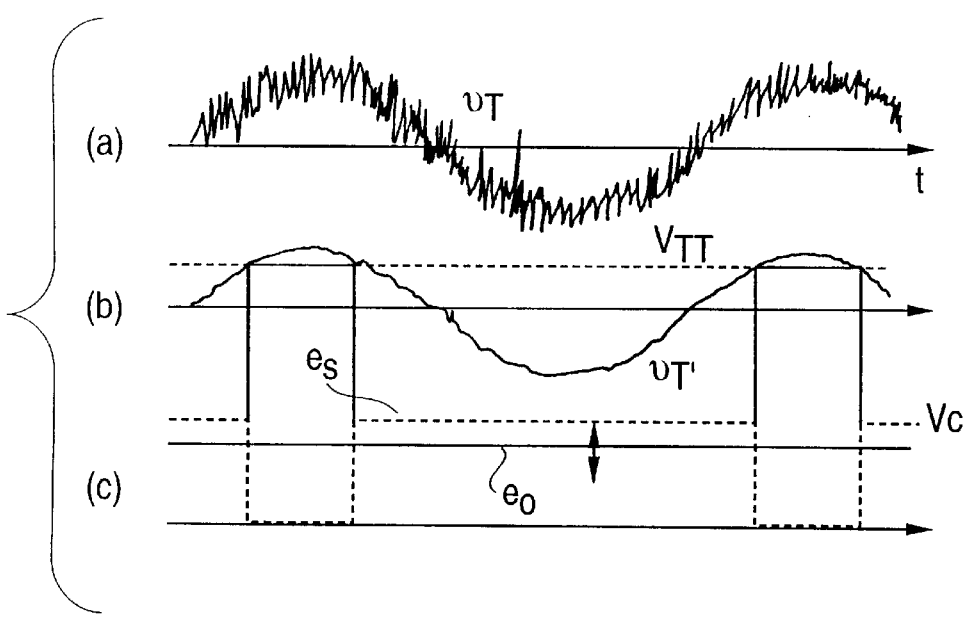
FIG. 3 illustrates waveform diagrams for describing the operation of the status determining means 19 of FIG. 2.

Drive voltage $V_T$ of the actuator coil 18 includes many high-frequency information signal leakage components produced by the pickup as shown in FIG. 3, plot(a). The disk is always rotating with eccentricity, and therefore, the pickup is driven in such a manner so as to follow the eccentricity, namely the tracking actuator is driven such that the same follows the eccentricity by servo control. The lowpass filter 21 extracts the drive voltage level for the disk eccentricity from $V_T$. In an 8× high-speed reproducing apparatus, a cutoff frequency of the lowpass filter 21 is set to a frequency level which higher than an expected disk inner periphery rotational speed (i.e., is set higher than 64 Hz in the above 8× example), for example, the cutoff frequency can be set to 80 Hz. Therefore, the lowpass filter 21 outputs a voltage signal $V_T'$ (FIG. 3.; plot b) equivalent to an amount of disk eccentricity obtained by removing the high-frequency information signal leakage components from the original voltage signal $V_T$. The level of this $V_T'$ signal necessarily increases in proportion to the amount of disk eccentricity of the disk.

The output voltage $V_T'$ from the lowpass filter 21 is compared with a reference voltage $V_{rT}$ 29 by the voltage comparator 27. The reference voltage $V_{rT}$ is equivalent to a maximum allowable voltage drive level determined at a maximum power dissipation allowed by the tracking actuator coil 18. A compare output of the voltage comparator 27 is inverted by the transistor 34 to become a compare output $e_s$. Namely, If $V_T'$ is higher in level than $V_{rT}$, a compare signal $e_s$ of a "Low" level is outputted; if lower, a compare signal $e_s$ of a "High" level is outputted. An outputted compare signal $e_s$ is converted to a direct current voltage through the lowpass filter composed of the resistor 36 and the capacitor 37, to thus be led to the output terminal 38 as a detect signal $e_0$.

Described above is a circuit signal flow with respect to the tracking actuator coil 18. The path of the focus actuator coil 15 operates in a similar manner. More particularly, briefly, a disk planar vibration is detected from the drive voltage $V_f$ of the actuator coil 15 through the lowpass filter 24. When a maximum allowable voltage drive level $V_{rF}$ determined at a maximum power dissipation allowed by the actuator coil 15 is exceeded, a compare signal $e_s$ of a "High" value is outputted; if not exceeded, the detect signal $e_0$ is outputted to the output terminal 38.

It should be noted that the resistor 33 of FIG. 2 provides a common load resistor for the transistors 34 and 35 for phase converting comparison. At a time when either the comparator 27 or the comparator 28 operates, the signal $e_s$ presents a waveform as indicated in FIG. 3, plot(c).

The detect signal $e_0$ of the above-mentioned status determining means 19 is entered in the identification means 20. The identification means 20 identifies the level of this detect signal $e_0$, and if $e_0$ goes lower than a predetermined value (being indicative that the disk eccentricity or planar vibration is excessive or unacceptable), the identification means 20 outputs the control signal N (e.g., N=7) which lowers the reproducing speed from the high-speed 8× reproducing speed/operation to a lower-speed 7× reproducing speed/operation. If, in FIG. 3, a disk eccentricity and/or planar vibration are small in an 8× (or even lower) reproducing speed state and the detect signals are lower than $V_{rT}$ or $V_{rF}$, respectively, the signal $e_s$ is "High"; namely, the output $e_0$ is $V_c$. In this state, the control signal N=8 is outputted from the recognizing means 19. If the disk eccentricity or planar vibration is large in an 8× (or even lower) reproduction speed/operation, and the detect signals exceed one of $V_{rT}$ or $V_{rF}$, respectively, the signal $e_s$ presents the waveform of FIG. 3, plot (c), causing the output $e_0$ to go lower than $V_c$. The recognizing or identifying means 20 recognizes this and outputs a control instruction signal N that lowers the reproducing speed from 8× to 7× (or an even lower speed), for example.

The disk rotational speed switching control means 6 controls the disk motor drive circuit 3 according to a control instruction value N coming from the identification means 20 to rotate the disk 1 at a specified N-times speed. The disk rotational control of the CD-ROM apparatus is based on CLV as is the conventional CD player. Therefore, the disk rotational speed switching control means 6 detects a synchronization signal from disk reproduction data and controls the disk motor drive circuit 3 such that the frequency of the synchronization signal reaches a specified value comparable to the specified N-times speed. Details of this control will be omitted from the description herein, as such teachings are known in the art with respect to the conventional CD player. If the control instruction of the identification means 20 is, for example, N=8 designating an 8× speed, the disk motor drive circuit 3 is controlled to make the reproduction synchronization signal frequency 8 times as high as a reference value (standard reproducing speed); if N is 7, the disk motor drive circuit 3 is controlled to make the signal frequency 7 times as high as the reference value.

In the above-mentioned novel construction, when a command for reproduction is issued to the microprocessor not shown for example that controls the entire system with a disk loaded, the identification means 20 outputs an initial setting, N=8 for example, based on which the disk is rotationally controlled at the 8× speed, providing a high-speed reproducing operation at the 8× speed.

When, during an 8× reproducing operation, the eccentricity or planar vibration of the loaded disk 1 is small, namely, the drive voltage level corresponding to the small eccentricity or planar vibration of the focusing or tracking actuator is small, the status determining means 19 outputs the value $V_c$ by the above-mentioned operation. If the output $e_0$ of the status determining means 19 is $V_c$, the identification means 20 recognizes that the eccentricity or planar vibration of the loaded disk is small. Therefore, such is indicative that the actuator power dissipation is within an allowable range while the disk is being driven at an 8× speed. Thus, the arrangement keeps outputting the control command N=8. Namely, the disk reproduction is continued at the initial setting of an 8× speed without change.

Conversely, if the eccentricity or planar vibration of the loaded disk is large during an 8× reproducing operation, namely, the drive voltage level corresponding to the large eccentricity or planar vibration of the focus or tracking actuator is large, the status determining means 19 outputs a value lower than $V_c$. Upon recognition of the lowering of the output $e_0$ of the status determining means 19 below $V_c$, the identification means 20 recognizes that the eccentricity and planar vibration of the loaded disk is large and that a continued driving of the disk at an 8× speed will make the actuator power dissipation exceed an allowable value. Accordingly, the identification means lowers the N value from 8 to 7. Namely, the disk reproducing speed is switched from the initial setting of 8× speed to a low-speed of 7×.

When the disk reproducing speed has previously been switched to a lower speed, e.g., 7×, the identification means 20 keeps monitoring the output $e_0$ of the status determining means 19. If the output $e_0$ is still lower than $V_c$, the identification means recognizes that continued driving of the disk at an 7× speed will make the actuator power dissipation exceed an allowable value. Accordingly, the arrangement lowers the N value from 7 to 6 for example, to effect operation at an even lower speed. Subsequently, this operation is repeated to automatically control the disk reproducing speed to be lowered to a level within the allowable power dissipation range of the actuator.

Meanwhile, when the reproducing speed lowers from the initial setting of 8× due to the eccentricity or planar vibration of the disk, it is desired that the arrangement be informative to a user, and that the reduction of the reproducing speed be displayed by some means. For example, the numerical value of an actual reproducing speed can be displayed on an LCD, on a single LED bulb, or a multi-segment LED.

Figure 4:
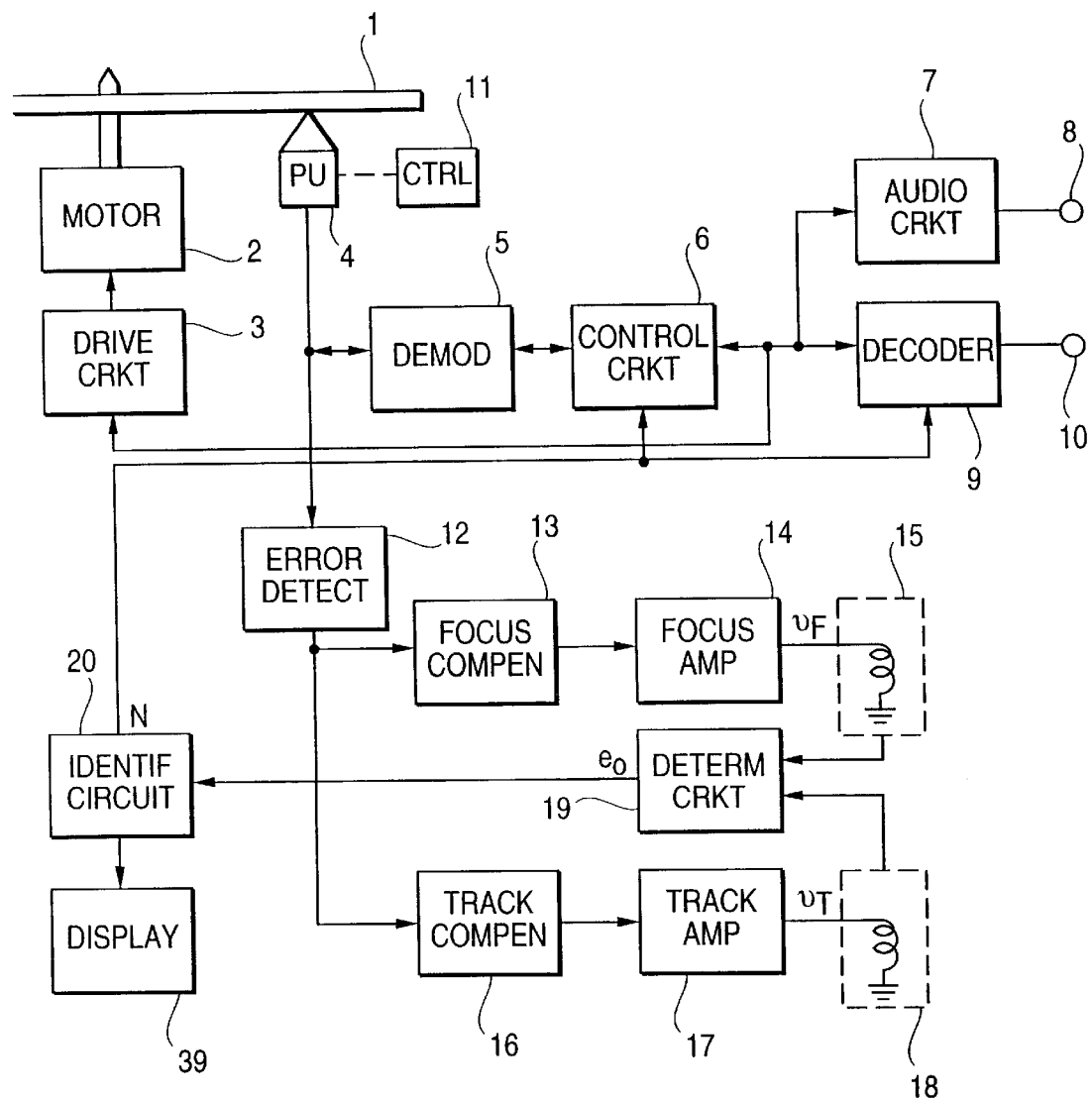
FIG. 4 is a block diagram illustrating a second embodiment of the disk reproducing apparatus of the present invention.
Figure 5:
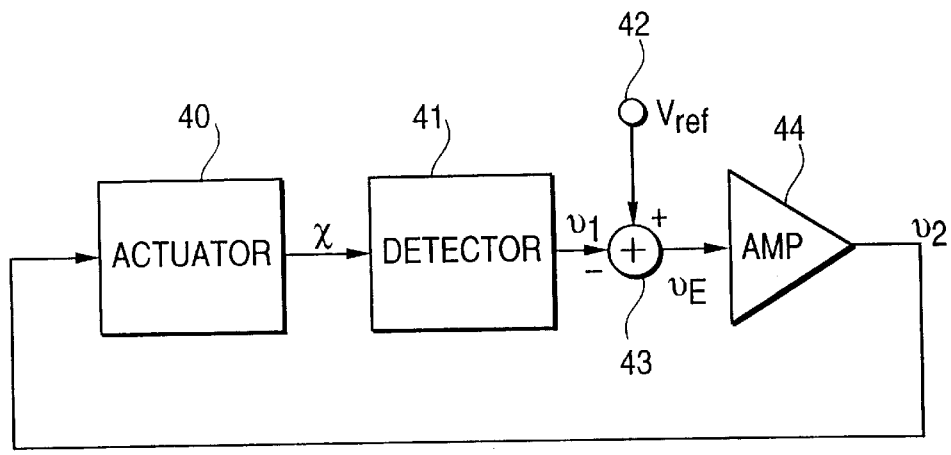
FIG. 5 is a block diagram illustrating an exemplary basic construction of the focusing and tracking servo system of an optical pickup of a CD-ROM apparatus.
Figure 6:
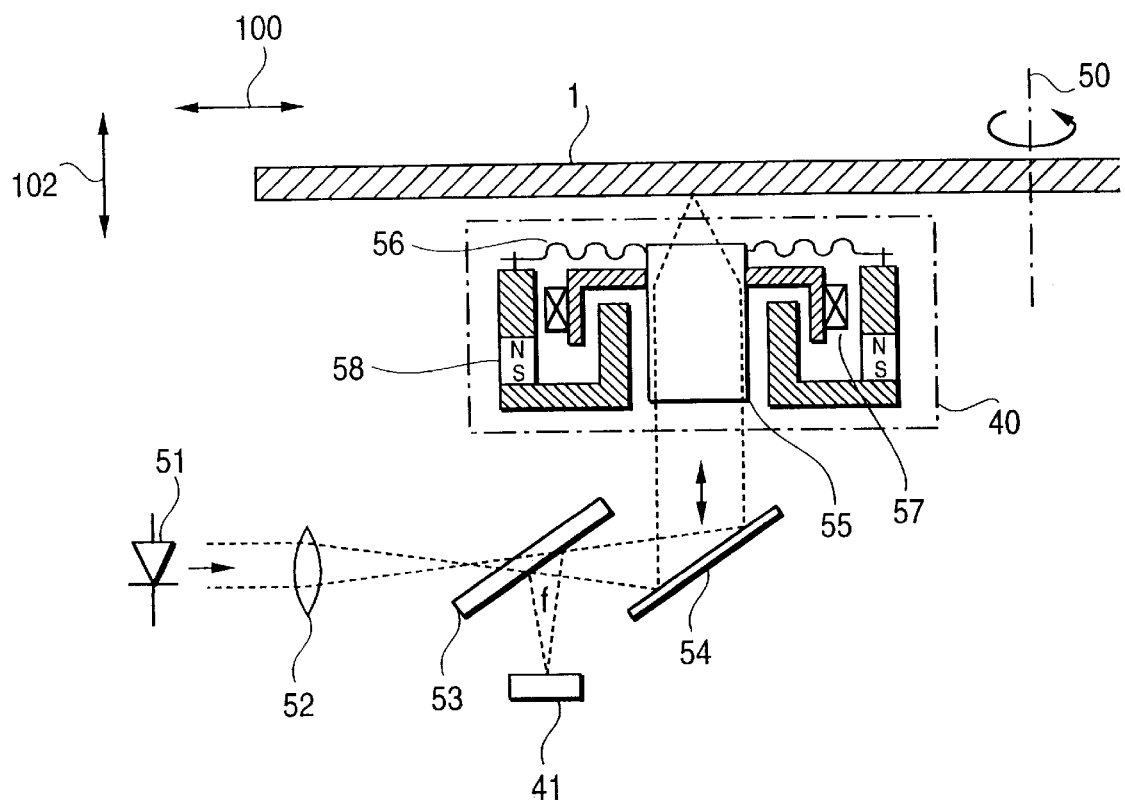
FIG. 6 is a diagram illustrating an exemplary basic construction of the optical pickup, and an eccentric and vibratory movement of a CD-ROM.
Figure 7:
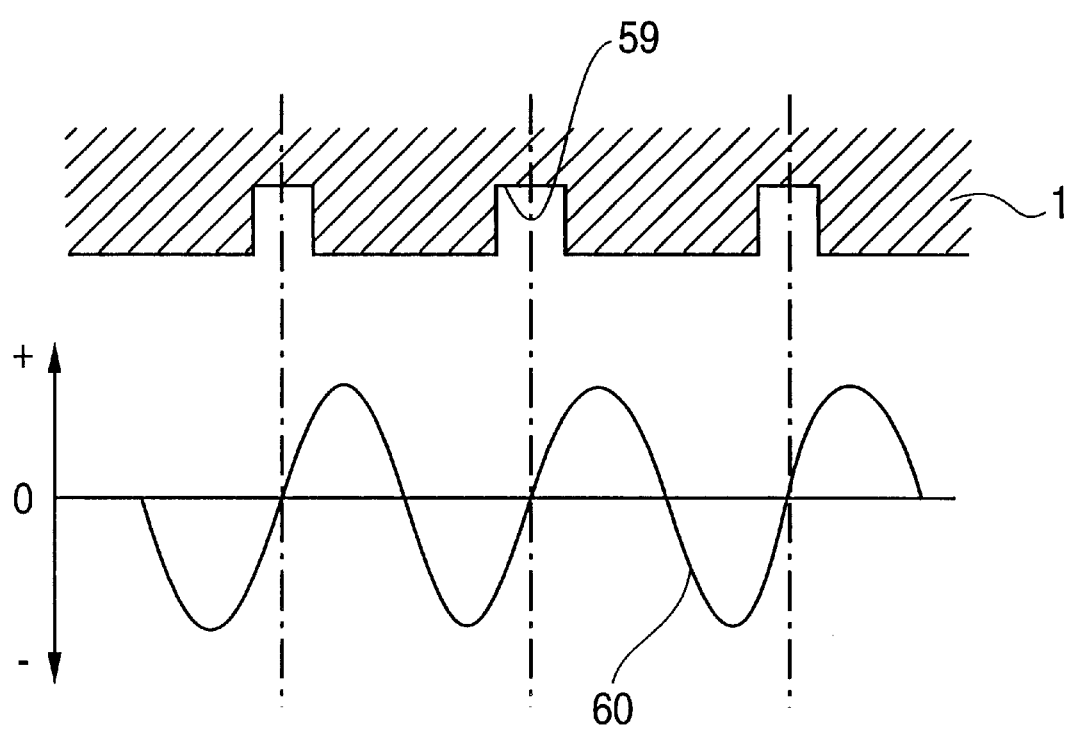
FIG. 7 is a diagram illustrating an output state of a tracking error signal of the optical pickup.
Figure 8A:
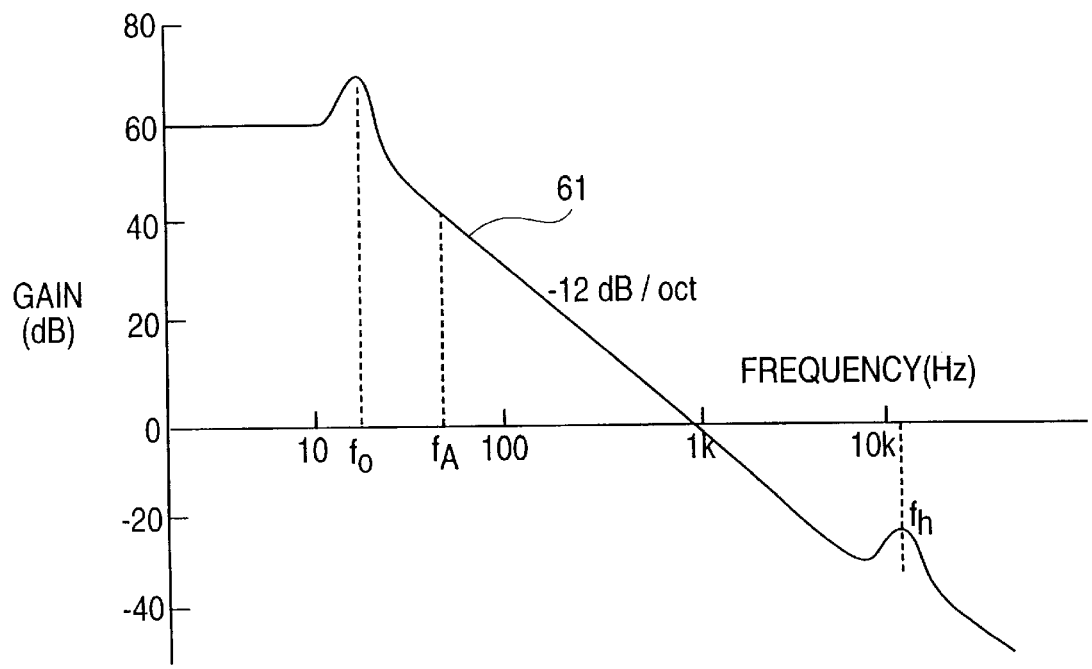
FIGS. 8A and 8B are diagrams illustrating frequency transmission characteristics of the focusing and tracking actuators.
Figure 8B:
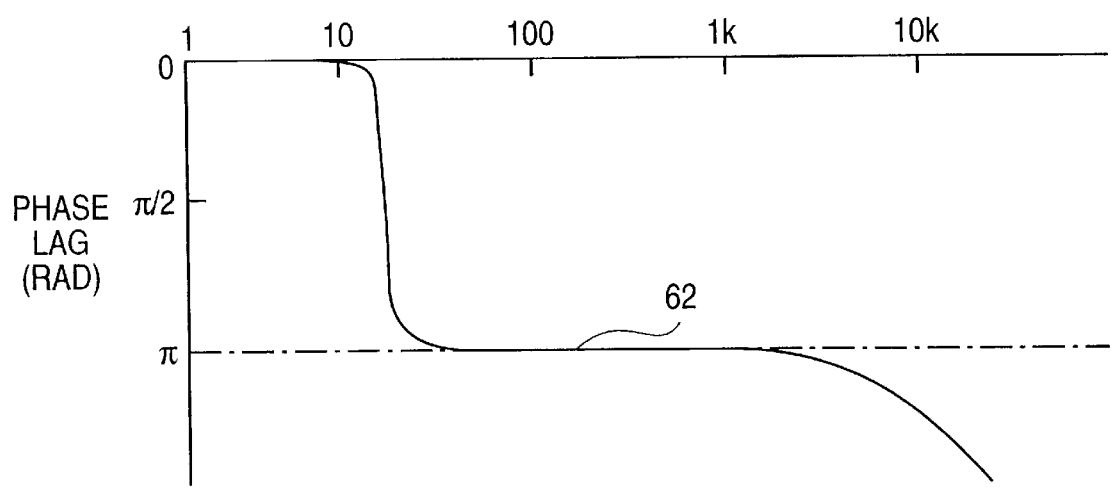
Figure 9:
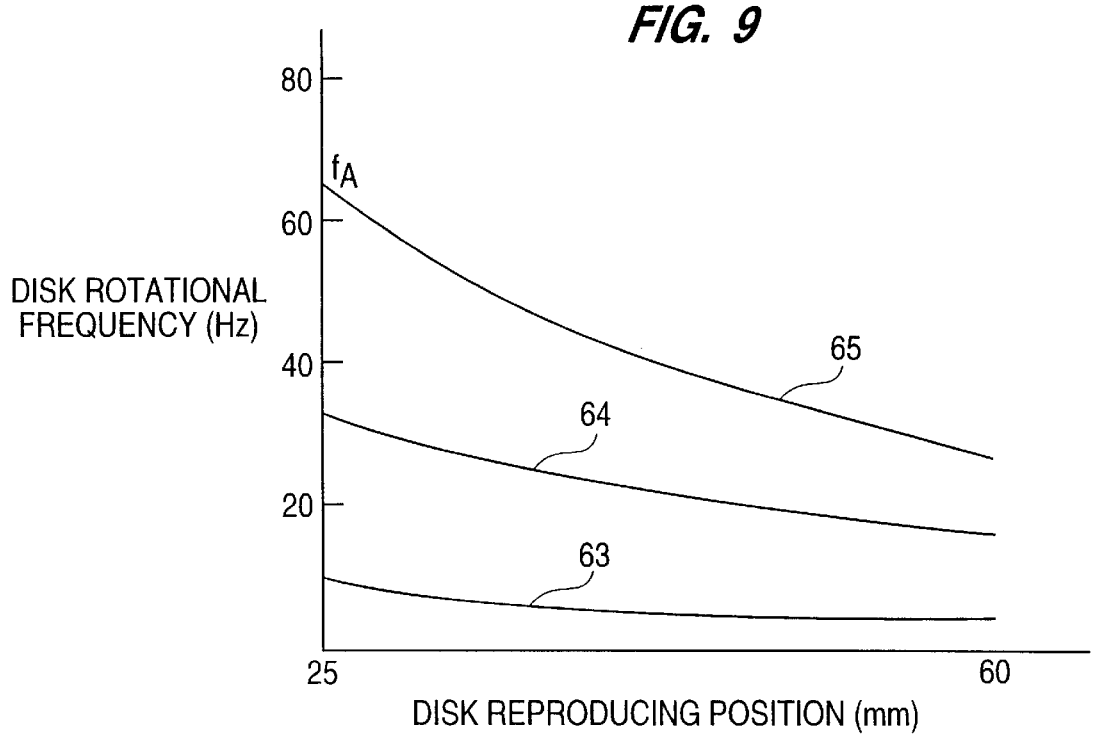
FIG. 9 is a diagram illustrating a relationship between a reproducing position for disk reproducing speed, and a disk rotational speed.
Figure 10:
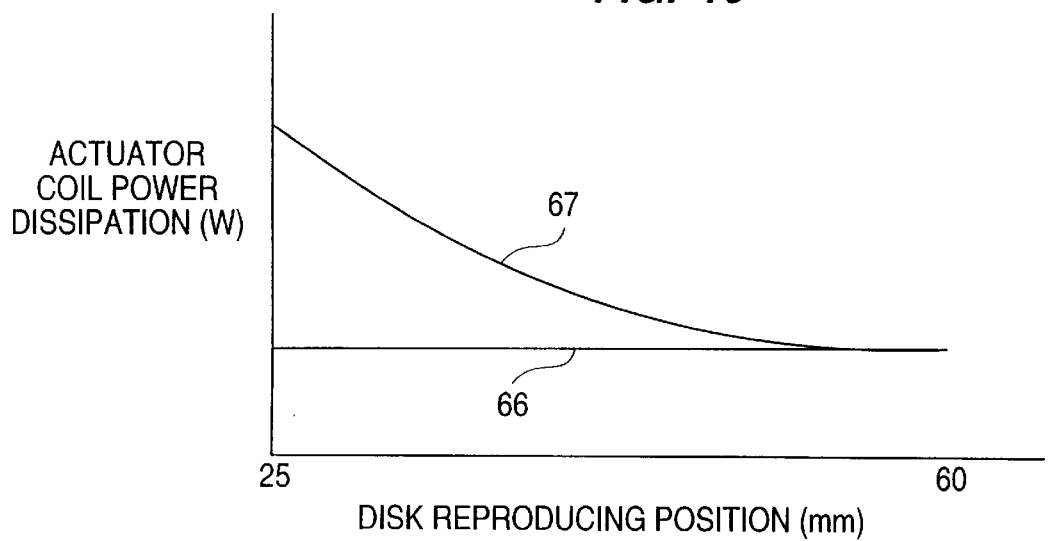
FIG. 10 is a diagram illustrating the relationship between the reproducing position for disk reproducing speed, and a focusing or tracking actuator power dissipation.

FIG. 4 is the disk reproducing apparatus practiced as another embodiment of the present invention with the above-mentioned display means taken into consideration. In the figure, reference numeral 39 indicates a display apparatus driven by the identification means 20. The other components similar to those of FIG. 1 are denoted by the same reference numerals.

The display apparatus 39 is constituted by a liquid crystal display (LCD), or a multi-segment or single LED (Light Emitting Diode), for example, and displays information related to an operation speed by light, based on a control signal coming from the identification means 20, e.g., when the identification means 20 outputs a control signal other than N=8 indicative that the eccentricity or planar vibration of the loaded disk is large, and a reproducing speed has been lowered from the initial setting of 8×.

Thus, several preferred embodiments of the present invention have been described, but again, it is submitted that practice of the present invention is not limited thereto. More particularly, the specific exemplary circuit 19 of FIG. 2 can be used within the FIG. 1 embodiment for detecting the level of the actuator drive voltage, but practice of the FIG. 1 embodiment is not limited thereto, other suitable detection circuits can be used. Further, it will be apparent a disk eccentricity and/or planar vibration can be detected by numerous arrangements, e.g., either detecting a current flowing in the actuator coil, detecting a drive power, detecting a vibration of the actuator, or detecting an actual temperature of the actuator coil (although a temperature detection arrangement would be more complex).

Figure 11:
FIG. 11 is a block diagram of a microprocessor which can alternatively be used in the embodiments of the present invention.
Figure 12:
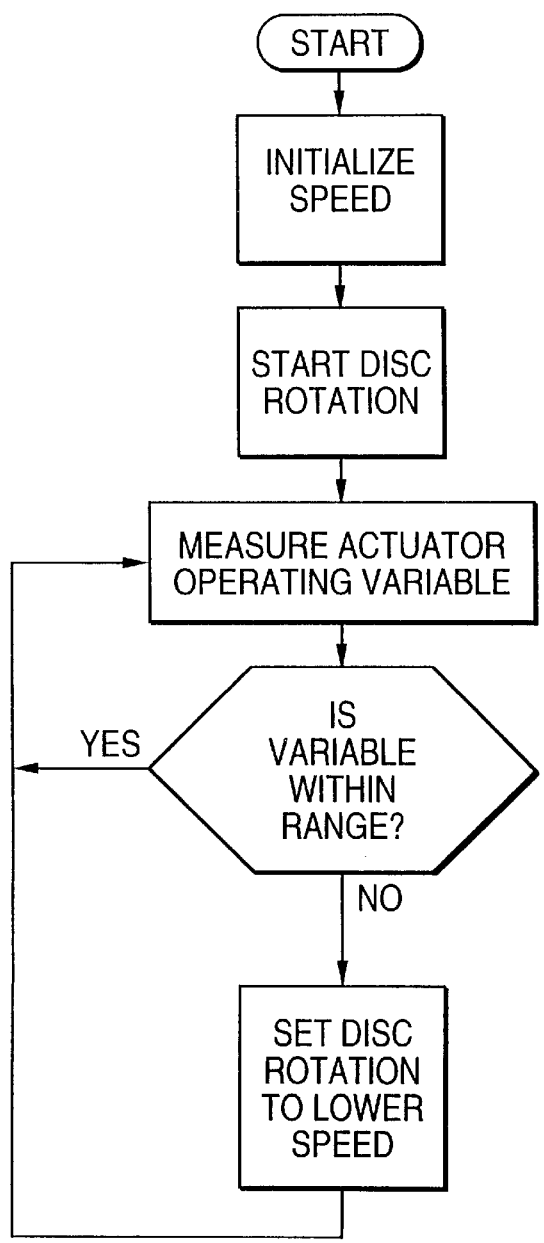
FIG. 12 is a flowchart of steps performed by the microprocessor of FIG. 11.

In the first embodiment, the identification means 20 and control circuit 6 are provided independently, but those skilled in the art will readily recognize that practice of the present invention not limited thereto. More specifically, it will be apparent that the functions provided by at least the identification means 20 and control circuit 6 may be provided by a microprocessor (FIG. 11), for example, which controls operations of the entire apparatus. FIG. 12 shows flowchart steps of the microprocessor providing the function of the identification means 20. Further, in the FIG. 4 embodiment, the display apparatus 39 is driven by the identification means 20, but again an arrangement of the present invention is not limited thereto. It will be apparent that the display apparatus can be driven by the disk rotational speed switching control means 6 for example. It will also be apparent that various modifications may be made to the present invention without departing from the scope thereof.

As mentioned above and according to the invention, any eccentricity and/or planar vibration of the disk are automatically detected to control a reproducing speed accordingly. Namely, when an eccentricity and/or planar vibration are small, an initial predetermined high-speed reproducing operation of an 8× speed is continued to be performed. When an eccentricity and/or planar vibration are large, the reproducing speed is sequentially and automatically switched (i.e., reduced) from 8× to 7× and to 6×, for example, so as to guarantee operation within an allowable power range of the actuator. This setup allows a disk of which an eccentricity and planar vibration are small to be reproduced at a high-speed of 8×. This setup also allows a disk of which an eccentricity and planar vibration are large to still be reproduced, but at a lower, safer reproducing speed, i.e., prevents the pickup actuator from being driven unnecessarily or excessively, which in turn prevents excessive heat generation of the actuator from occurring.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject components and/or combination arrangement within the scope of the foregoing disclosure, the drawings and the appended claims without departing from the spirit of the invention, e.g., the following represents a non-exhaustive list of modifications which might readily be apparent to one skilled in the art to which the present invention is directed: while the present invention has been described as effecting only a speed reduction responsive to excessive eccentricity and/or planar vibration, the present invention can likewise be modified to also effect a speed increase in the absence of excessive eccentricity and/or planar vibration.

For example, as extremely excessive eccentricity and/or vibration may actually contact and damage an optical pickup (e.g., upon start-up of the apparatus), the apparatus can be arranged to start at an initial lower speed, e.g., 4×, and then increase progressively through sequentially higher speeds, e.g., 5× to 6× and to 7×, etc., as long as a detected eccentricity and/or vibration does not become excessive. Alternatively, if apparatus operation is toggled to a lower speed, e.g., 7×, responsive to excessive eccentricity and/or vibration, the apparatus can be arranged to subsequently detect (e.g., every 5 seconds) whether the such eccentricity and/or vibration has stopped for a predetermined time (e.g., 10 seconds), and if so, arranged to increase the speed back up to the initial 8× speed. A good example of vibration being removed would be subsequent removal of the apparatus from a vibrating automobile. Further, while the present invention was described as being applicable to a constant linear velocity (CLV) apparatus, the invention is equally applicable to a constant angular velocity (CAV) apparatus.

In addition to variations and modifications in the component parts and/or arrangements, uses with alternative apparatus will also be apparent to those skilled in the art. More particularly, while the above disclosure has discussed applications of the subject combination arrangement with respect to a reproducing apparatus, it will be apparent to those skilled in the art that each of the subject combination arrangements are not so limited to such usage, but instead, could find application in a tremendous number of other apparatus uses, e.g., the combination arrangement disclosed above likewise has applicability in a writing apparatus, DVD apparatus, etc.

What is claimed is:

1. A method of controlling an operation of a disk apparatus wherein a disk is rotated to at least one of read and write information from and to the disk by a member driven by an actuator and movable with respect to the disk, said method comprising the steps of:

monitoring a parameter of the actuator when the disk is rotated at a present rotating speed, and outputting an output corresponding thereto;

comparing the output of the parameter of the actuator to determine whether the output is within a predetermined range; and when the output of the parameter is within the predetermined range, continuing to rotate the disk at the present rotating speed, and when the output of the parameter is not within the predetermined range, changing the present rotating speed to a new rotating speed.

2. A method as claimed in claim 1, wherein the method is one of continuously and periodically repeated until the parameter is within the predetermined range.

3. A method as claimed in claim 1, wherein the output of the parameter of the actuator is indicative of at least one of a rotational eccentricity and planar vibration of the rotating disk at a present rotating speed, and the predetermined range is more specifically a predetermined acceptable range of at least one of an acceptable rotational eccentricity and an acceptable planar vibration of the rotating disk, and wherein if the output of the parameter is not within the predetermined acceptable range, changing the present rotating speed to a lower rotating speed.

4. A method as claimed in claim 1, wherein the output of the parameter of the actuator is indicative of at least one of a focusing fluctuation and linear positioning fluctuation of the actuator to follow a rotational eccentricity and planar vibration of the rotating disk at a present rotating speed, and the predetermined range is more specifically a predetermined acceptable range of at least one of an acceptable focusing fluctuation and linear positioning fluctuation of the actuator, and wherein if the output of the parameter is not within the predetermined acceptable range, changing the present rotating speed to a lower rotating speed.

5. A method of controlling an operation of a disk apparatus wherein a disk is rotated to at least one of read and write information from and to the disk by a member driven by an actuator and movable with respect to the disk, said method comprising the steps of:

monitoring a parameter of the actuator when the disk is rotated at a present rotating speed, and outputting an output corresponding thereto;

comparing the output of the parameter of the actuator to determine whether the output is within a predetermined range; and when the output of the parameter is within the predetermined range, continuing to rotate the disk at the present rotating speed, and when the output of the parameter is not within the predetermined range, changing the present rotating speed to a new rotating speed;

wherein the output of the parameter of the actuator is indicative of at least one of a rotational eccentricity and planar vibration of the rotating disk at a present rotating speed, and the predetermined range is more specifically a predetermined acceptable range of at least one of an acceptable rotational eccentricity and an acceptable planar vibration of the rotating disk, and wherein if the output of the parameter is not within the predetermined acceptable range, changing the present rotating speed to a lower rotating speed;

wherein the output of the parameter of the actuator more specifically corresponds to at least one of a present operating voltage, a present operating current and a present operating temperature of the actuator.

6. A method of controlling an operation of a disk apparatus wherein a disk is rotated to at least one of read and write information from and to the disk by a member driven by an actuator and movable with respect to the disk, said method comprising the steps of:

monitoring a parameter of the actuator when the disk is rotated at a present rotating speed, and outputting an output corresponding thereto;

comparing the output of the parameter of the actuator to determine whether the output is within a predetermined range; and when the output of the parameter is within the predetermined range, continuing to rotate the disk at the present rotating speed, and when the output of the parameter is not within the predetermined range, changing the present rotating speed to a new rotating speed;

wherein the output of the parameter of the actuator is indicative of at least one of a rotational eccentricity and planar vibration of the rotating disk at a present rotating speed, and the predetermined range is more specifically a predetermined acceptable range of at least one of an acceptable rotational eccentricity and an acceptable planar vibration of the rotating disk, and wherein if the output of the parameter is not within the predetermined acceptable range, changing the present rotating speed to a lower rotating speed; and wherein a microprocessor is used to perform at least the comparing, continuing and changing steps.

7. A method as claimed in claim 5, wherein the member is more specifically driven by a plurality of actuators, and wherein the method is separately conducted with respect to each actuator of said plurality of actuators.

8. A method as claimed in claim 7, wherein the member is more specifically driven by a focusing actuator for effecting focus of the member with respect to the rotating disk, and a positioning actuator for effecting linear positioning of the member with respect to the rotating disk, and wherein the method is separately conducted with respect to the focusing actuator and the positioning actuator.

9. A method as claimed in claim 8, wherein the method is more specifically provided with respect to a constant linear velocity (CLV) disk rotation apparatus.

10. A method as claimed in claim 8, wherein the method is more specifically provided with respect to a constant angular velocity (CAV) disk rotation apparatus.

11. A method as claimed in claim 9, wherein upon an initial rotation of the disk, setting a predetermined rotating speed as the present rotating speed.

12. A method according to claim 11, wherein the disk is rotated at at least first and second speeds for a reproducing operation to enable reading of information from the disk, and the member driven by the actuator is a lens.

13. A method according to 12, including the further step of displaying information on a display indicating that the reproducing speed of said disk has been changed.

14. A method according to 13, wherein the display is more specifically one of a liquid crystal display (LCD), a singular light emitting diode (LED) and a multi-segment LED, and the displaying step more specifically provides indication of a present reproducing speed of the disk.

15. A method as claimed in claim 1, wherein the comparing step more specifically includes the step of determining whether the output of the parameter of the actuator is within a predetermined range for a predetermined time; and when the output of the parameter is within at least one of the predetermined range and predetermined time, continuing to rotate at the present rotating speed, and when the output of the parameter is not within at least one of the predetermined range and predetermined time, changing the present rotating speed to a new rotating speed.

16. A disk reproducing apparatus having an information read section for reading information recorded on a disk and an actuator section for performing focusing and/or tracking control on said information read section, comprising:

switching control device for switching a disk reproducing speed between a first reproducing speed and a second reproducing speed that is lower than said first reproducing speed depending on information associated with an operating variable of said actuator section;

wherein, if the information associated with said operating variable is smaller than a predetermined value, said disk is reproduced by setting the disk reproducing speed to said first reproducing speed and, if the information associated with said operating variable is greater than said predetermined value, said disk is reproduced by setting the disk reproducing speed to said second reproducing speed.

17. An apparatus having a disk rotated to at least one of read and write information from and to the disk, comprising:

a member driven by an actuator and movable with respect to the disk, to at least one of read and write information from and to the disk;

a monitoring device monitoring a parameter of the actuator when the disk is rotated at a present rotating speed, and outputting an output corresponding thereto;

a comparator device comparing the output of the parameter of the actuator to determine whether the output is within a predetermined range; and a control device which, when the output of the parameter is within the predetermined range, continues to rotate the disk at the present rotating speed, and when the output of the parameter is not within the predetermined range, changes the present rotating speed to a new rotating speed.

18. An apparatus as claimed in claim 17, wherein the monitoring device, comparator device and control device at least one of continuously and periodically repeat their operations until the parameter is within the predetermined range.

19. An apparatus as claimed in claim 17, wherein the output of the parameter of the actuator is indicative of at least one of a rotational eccentricity and planar vibration of the rotating disk at a present rotating speed, and the predetermined range is more specifically a predetermined acceptable range of at least one of an acceptable rotational eccentricity and an acceptable planar vibration of the rotating disk, and wherein if the output of the parameter is not within the predetermined acceptable range, changing the present rotating speed to a lower rotating speed.

20. An apparatus as claimed in claim 17, wherein the output of the parameter of the actuator is indicative of at least one of a focusing fluctuation and linear positioning fluctuation of the actuator to follow a rotational eccentricity and planar vibration of the rotating disk at a present rotating speed, and the predetermined range is more specifically a predetermined acceptable range of at least one of an acceptable focusing fluctuation and linear positioning fluctuation of the actuator, and wherein if the output of the parameter is not within the predetermined acceptable range, the control device changes the present rotating speed to a lower rotating speed.

21. An apparatus having a disk rotated to at least one of read and write information from and to the disk, comprising:

a member driven by an actuator and movable with respect to the disk, to at least one of read and write information from and to the disk;

a monitoring device monitoring a parameter of the actuator when the disk is rotated at a present rotating speed, and outputting an output corresponding thereto;

a comparator device comparing the output of the parameter of the actuator to determine whether the output is within a predetermined range; and a control device which, when the output of the parameter is within the predetermined range, continues to rotate the disk at the present rotating speed, and when the output of the parameter is not within the predetermined range, changes the present rotating speed to a new rotating speed;

wherein the output of the parameter of the actuator is indicative of at least one of a rotational eccentricity and planar vibration of the rotating disk at a present rotating speed, and the predetermined range is more specifically a predetermined acceptable range of at least one of an acceptable rotational eccentricity and an acceptable planar vibration of the rotating disk, and wherein if the output of the parameter is not within the predetermined acceptable range, changing the present rotating speed to a lower rotating speed;

wherein the output of the parameter of the actuator more specifically corresponds to at least one of a present operating voltage, a present operating current and a present operating temperature of the actuator.

22. An apparatus having a disk rotated to at least one of read and write information from and to the disk, comprising:

a member driven by an actuator and movable with respect to the disk, to at least one of read and write information from and to the disk;

a monitoring device monitoring a parameter of the actuator when the disk is rotated at a present rotating speed, and outputting an output corresponding thereto;

a comparator device comparing the output of the parameter of the actuator to determine whether the output is within a predetermined range; and a control device which, when the output of the parameter is within the predetermined range, continues to rotate the disk at the present rotating speed, and when the output of the parameter is not within the predetermined range, changes the present rotating speed to a new rotating speed;

wherein the output of the parameter of the actuator is indicative of at least one of a rotational eccentricity and planar vibration of the rotating disk at a present rotating speed, and the predetermined range is more specifically a predetermined acceptable range of at least one of an acceptable rotational eccentricity and an acceptable planar vibration of the rotating disk, and wherein if the output of the parameter is not within the predetermined acceptable range, changing the present rotating speed to a lower rotating speed;

wherein the monitoring device, comparator device and control device are provided by a microprocessor.

23. An apparatus as claimed in claim 21, wherein the member is more specifically driven by a plurality of actuators, and wherein the monitoring device, comparator device and control device conduct separate operations for each actuator of said plurality of actuators.

24. An apparatus as claimed in claim 23, wherein the member is more specifically driven by a focusing actuator for effecting focus of the member with respect to the rotating disk, and a positioning actuator for effecting linear positioning of the member with respect to the rotating disk, and wherein the monitoring device, comparator device and control device conduct separate operations for each of the focusing actuator and the positioning actuator.

25. An apparatus as claimed in claim 24, wherein the apparatus is more specifically a constant linear velocity (CLV) disk rotation apparatus.

26. An apparatus as claimed in claim 24, wherein the apparatus is more specifically a constant angular velocity (CAV) disk rotation apparatus.

27. An apparatus as claimed in claim 24, further comprising an initializing device, wherein upon an initial rotation of the disk, sets a predetermined rotating speed as the present rotating speed.

28. An apparatus according to claim 27, wherein the disk is rotated at at least first and second speeds for a reproducing operation to enable reading of information from the disk, and the member driven by the actuator is a lens.

29. An apparatus according to 28, further comprising a display for displaying information indicating that the reproducing speed of said disk has been changed.

30. An apparatus according to 29, wherein the display is more specifically one of a liquid crystal display (LCD), a singular light emitting diode (LED) and a multi-segment LED, and more specifically provides indication of a present reproducing speed of the disk.

31. An apparatus as claimed in claim 17, wherein the comparator more specifically determines whether the output of the parameter of the actuator is within a predetermined range for a predetermined time; and when the output of the parameter is within at least one of the predetermined range and predetermined time, the control device continues to rotate the disc at the present rotating speed, and when the output of the parameter is not within at least one of the predetermined range and predetermined time, the control device changes the present rotating speed to a new rotating speed.

32. A disk reproducing apparatus comprising:

an information read section for reading information recorded on a disk;
an actuator section for performing focusing and/or tracking control on said information read section;
a switching control device for switching a disk reproducing speed between a first reproducing speed and a second reproducing speed that is lower than said first reproducing speed depending on information associated with an operating variable of said actuator section;

wherein, if the information associated with said operating variable is smaller than a predetermined value, said disk is reproduced by setting the disk reproducing speed to said first reproducing speed and, if the information associated with said operating variable is greater than said predetermined value, said disk is reproduced by setting the disk reproducing speed to said second reproducing speed.

* * * * *